US011903340B1

(12) United States Patent
Bungart (10) Patent No.: US 11,903,340 B1
(45) Date of Patent: Feb. 20, 2024

(54) HOOKUP DESIGNS FOR ATTACHMENTS TO SKID STEER LOADERS AND THE LIKE

(71) Applicant: Brandon L. Bungart, Jefferson City, MO (US)

(72) Inventor: Brandon L. Bungart, Jefferson City, MO (US)

( * ) Notice: Subject to any disclaimer, the term of this patent is extended or adjusted under 35 U.S.C. 154(b) by 778 days.

(21) Appl. No.: 17/069,097

(22) Filed: Oct. 13, 2020

Related U.S. Application Data (63) Continuation-in-part of application No. 16/290,337, filed on Mar. 1, 2019, now abandoned, which is a
(Continued)

(51) Int. Cl.
*A01D 34/64* (2006.01)
*A01D 34/86* (2006.01)
(Continued)

(52) U.S. Cl.
CPC ............ *A01D 34/64* (2013.01); *A01B 59/064* (2013.01); *A01D 34/866* (2013.01); *A01D 67/005* (2013.01); *A01D 2101/00* (2013.01)

(58) Field of Classification Search
CPC ....... A01B 59/00–59/069; A01D 34/81; A01D 34/84; A01D 34/863; A01D 34/66–668;
(Continued)

(56) References Cited

U.S. PATENT DOCUMENTS

| 4,878,713 A | 11/1989 | Zanetis | ................ E01C 23/088 |
| 4,893,456 A | 1/1990 | Wallace | ................ A01D 34/64 |

(Continued)

FOREIGN PATENT DOCUMENTS

| GB | 987221 A | 3/1965 | .......... A01B 59/002 |
| WO | WO-2012074209 A2 | 6/2012 | .......... A01B 59/048 |

OTHER PUBLICATIONS

"Earthmoving Machinery-Coupling of Attachments to Skid Steer Loaders (Cancelled May 2008, Superseded by ISO 24410) J2513_200805" https://www.sae.org/standards/content/j2513_200805/, accessed online Feb. 27, 2020.
(Continued)

*Primary Examiner* — Adam J Behrens
*Assistant Examiner* — Madeline I Runco
(74) *Attorney, Agent, or Firm* — Jonathan A. Bay (57) ABSTRACT

A mower-to-skid steer loader mounting structure is affixed to the top panel of a heavy-duty mowing deck. The mounting structure has a top flange, and, a bottom flange. The bottom flange extends between a spaced first and second edge and is formed with a first and second pair of close-together rectangular holes, the first pair being disposed close to the first edge and the second pair closer to the second edge but not as close as between the first pair and first edge. Wherein the outboard hole of the first pair and the inboard hole of the second pair allow the mowing deck to be mounted offset relative the skid steer loader, while the inboard hole of the first pair and the outboard hole of the second pair allow the mowing deck to be mounted centered relative the skid steer loader.

19 Claims, 9 Drawing Sheets

Related U.S. Application Data continuation-in-part of application No. 15/898,988, filed on Feb. 19, 2018, now abandoned.

(60) Provisional application No. 62/464,670, filed on Feb. 28, 2017.

(51) Int. Cl.
*A01D 67/00* (2006.01)
*A01B 59/06* (2006.01)
*A01D 101/00* (2006.01)

(58) Field of Classification Search
CPC ............ A01D 75/30–306; A01D 34/64; A01D 34/866; A01D 67/005; A01D 2101/00; E02F 3/00–3/968; E01H 1/00–1/14
See application file for complete search history.

(56) References Cited

U.S. PATENT DOCUMENTS

| | | | |
|---|---|---|---|
| 4,896,489 A | 1/1990 | Wykhuis | A01D 34/662 |
| 4,987,689 A * | 1/1991 | Kaczmarski | E02F 3/10 |
| | | | 37/417 |
| 5,005,344 A | 4/1991 | McCracken | A01D 34/63 |
| 5,127,172 A * | 7/1992 | Lund | E02F 3/815 |
| | | | 37/903 |
| 5,425,224 A | 6/1995 | Downey | A01D 34/866 |
| 5,620,297 A | 4/1997 | Mahaney | A01D 87/0076 |
| 5,666,794 A * | 9/1997 | Vought | A01D 41/16 |
| | | | 172/112 |
| 5,713,419 A | 2/1998 | Kaczmarski et al. | E02F 3/96 |
| 5,771,672 A | 6/1998 | Gummerson | A01D 34/64 |
| 5,957,213 A | 9/1999 | Loraas et al. | E02F 3/96 |
| 5,966,912 A | 10/1999 | Swisher | A01D 75/185 |
| 6,223,510 B1 | 5/2001 | Gillins | A01D 34/64 |
| 7,226,268 B2 | 6/2007 | Gustafson | A01B 59/002 |
| 8,752,855 B2 | 6/2014 | Dilworth | A01B 59/064 |
| 8,857,144 B2 | 10/2014 | Koester | A01D 34/81 |
| 9,554,514 B2 | 1/2017 | Marotte | A01D 34/866 |
| 9,648,796 B1 | 5/2017 | Tschetter | A01B 35/14 |
| 2008/0098704 A1 | 5/2008 | Dairon | A01D 34/81 |
| 2013/0051964 A1* | 2/2013 | Bernier | E02F 3/96 |
| | | | 414/722 |

OTHER PUBLICATIONS

"ISO 24410:2005 Earth-moving machinery—Coupling of attachments to skid steer loaders" https://www.iso.org/standard/37202.html, accessed online Feb. 27, 2020.

Online front page of a manufacturer of various attachments for skid-steer-loaders, VIRNIG® of Rice, Minnesota https://www.virnigmfg.com/, accessed online Feb. 27, 2020.

Skid Steer Quick Attach Systems Basic, Accessed on Mar. 1, 2019 at www.quickattach.com/p-36090-skid-steer-quick-attach-stystem-basics.html.

SAE Standards, Earthmoving Machinery—Coupling of Attachments to Skid Steer Loaders—SAE J2513 Jun. 2000.

\* cited by examiner

HOOKUP DESIGNS FOR ATTACHMENTS TO SKID STEER LOADERS AND THE LIKE

CROSS-REFERENCE TO RELATED APPLICATION(S)

This application is a continuation-in-part of U.S. patent Ser. No. 16/290,337, filed Mar. 1, 2019; which is a continuation-in-part of U.S. patent application Ser. No. 15/898,988, filed Feb. 19, 2018, now abandoned; which claims the benefit of U.S. Provisional Application No. 62/464,670, filed Feb. 28, 2017. The foregoing patent disclosure(s) is/are incorporated herein by this reference thereto.

BACKGROUND AND SUMMARY OF THE INVENTION

The invention relates to land vehicles such as skid steer loaders or like machines and, more particularly, to improvements to hookup designs for attachments to skid steer loaders (and like machines). An example of an attachment would include without limitation a heavy-duty mowing deck. The improvement in accordance with the invention allows the skid steer loader (or like machine) to couple with the mowing deck in a plurality of alignments.

The two most preferred alignments are (1) the mowing deck centered with the skid steer loader and (2) the mowing deck offset either in one direction to the left or right or else to the other direction of right or left (the figures show the offset to be starboard, driver's right side, of the centered alignment) so that the mowing deck can reach underneath (for example and without limitation) the lowest strand of a barbed wire fence line.

There has been a standard design for 'universal quick attach' hookup or coupling designs for the attachments to skid steer loaders and like machines since around 1994. The Bobcat Company (today owned by the Doosan Company of South Korea) is credited with originating the 'universal quick attach' hookup design from which is derived today's industry standard.

"BOBCAT" ® has been a registered trademark since as early as 1958. See, eg., U.S. Trademark Registration No. 670,566—claiming first use in commerce that Congress can regulate since as early as Mar. 18, 1958.

The Quick Attach Attachments, LLC, company states on its web-site that, prior to 1994, manufacturers of skid steer loaders used a variety of designs for their attachment hookup designs. After 1994, an SAE (or ASE) standard became available and most manufacturers switched to an original uniform style, remnants of which can still be seen today.

"QUICK ATTACH ATTACHMENTS LLC (and design)" ® has been a registered trademark since as early as 2008. See, eg., U.S. Trademark Registration No. 3,519,538—claiming first use in commerce that Congress can regulate as early as Nov. 1, 2002.

BOBCAT® held early patent protection on what today is the universal quick attach hookup design, which BOBCAT® branded under the trademark BOB-TACH®.

"BOB-TACH" ® has been a registered trademark since 2011. See, eg., U.S. Trademark Registration No. 3,519,538—claiming first use in commerce that Congress can regulate as early as Dec. 31, 1969.

During the life of BOBCAT®'s patent protection, competitors created their own attachment hookup designs for their own machines. The shortcoming with this was, attachments made for one manufacturer would not fit others. For any person to change to another manufacturer's machine would typically require that person to adapt the new machine to fit that person's pre-existing inventory of attachments.

When the patent protection expired (~1994), most manufacturers got together and adopted BOB-TACH® hookup design (or something very close) as the standard.

However, that original 1994 standard was replaced by SAE J2513 JUN2000 (presumptively, around the year 2000). The two standards are not compatible. The standard of SAE J2513 is wider among other differences, and affords a much more robust hookup or coupling between the skid steer and the attachment.

So for a time in the early 2000's, there were about as many machines configured with the 1994 narrow-design coupling standard as there were of newer machines which almost all came out in favor of the SAE J2513 wide design.

But nowadays, as the older machines are being retired from service, seeing any machine with the 1994 narrow-design coupling standard is rare. As the modem assortment of attachments rarely support coupling according the 1994 narrow-design coupling standard, owners of such machines must (or may) resort to buying adapter (or conversion) kits as from AMAZON®.

It is not really any object of the invention to be concerned with the 1994 narrow-design coupling standard. As time extends, such machines and such attachments exclusive for them will become scarcer and scarcer and hence become even more and more of an historical footnote. Conversely, it is an object of the invention to be concerned with the SAE J2513 standard. The hookup (or coupling design) according that standard has the exceptional robustness which is advantageous for the purposes of the invention. The SAE J2513 standard has been "superseded" by an ISO counterpart, ISO 24410. But ISO 24410 is no replacement, it is an equivalent and merely continues the SAE J2513 standard, perhaps with standardized metric equivalents.

It is an object of the invention to provide a hookup design which offers the user to hookup the attachment in alternative alignments. That is, for example and without limitation, it is an object of the invention to give the user option to hookup the attachment in an alignment centered with the machine, or alternatively, offset.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 1:
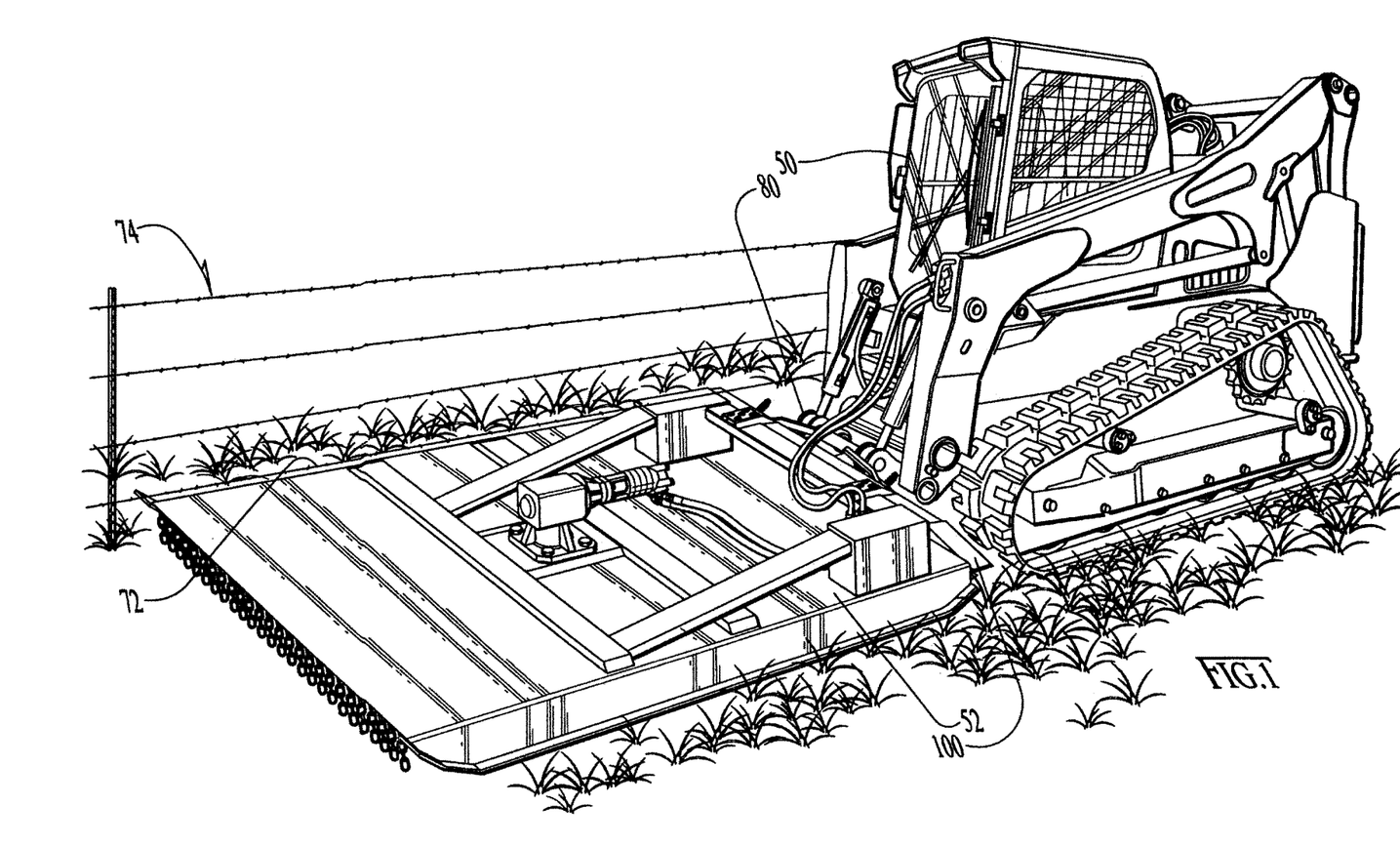
FIG. 1 is a perspective view of a skid steer loader (eg., vehicle) in accordance with the prior art and a heavy-duty mowing deck (eg., attachment) also in accordance with the prior art provided with an improvement in accordance with the invention on the design of the hookup between the mowing deck and the skid steer loader.

FIG. 1 shows a skid steer loader 50 (eg., vehicle 50) in accordance with the prior art and a heavy-duty mowing deck 52 (eg., attachment 52) also in accordance with the prior provided with an improvement in accordance with the invention (ie., receiver 100) on the design of the hookup between for the vehicle 50 and attachment 52.

Figure 3:
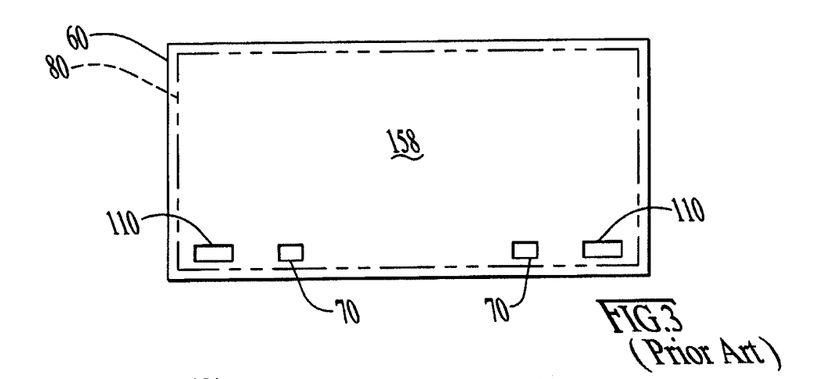
FIG. 3 is a block diagram in accordance with the prior art showing an attachment receiver in accordance with the prior art hooked up with a vehicle jam structure in accordance with prior art.
Figure 6:
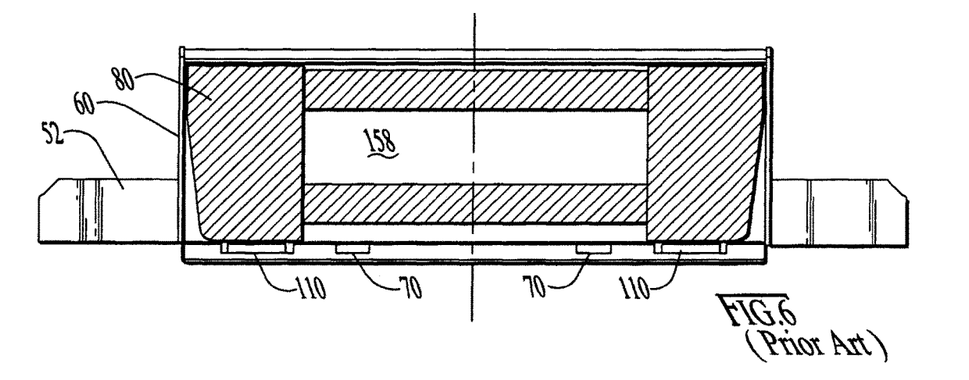
FIG. 6 is an elevational view, comparable to FIG. 3 and partly in section, showing the attachment receiver in accordance with the prior art hooked up with the vehicle jam structure in accordance with prior art.

FIGS. 3 and 6 show a design of a receiver 60 in accordance with the prior art for an 'universal quick attach' hookup design for an attachment 52.

FIG. 3 in particular could be taken from U.S. Pat. No. 8,857,144—Koester (see, eg., reference numeral 24 in FIG. 5 thereof). Alternatively, FIG. 3 is similar to what is shown on the website of the Quick Attach Attachments, LLC, company, on a page entitled "Skid steer loader Quick Attach System Basics," accessed online Mar. 1, 2019 at www.quickattach.com/p-36090-skid-steer-quick-attach-system-basics.html.

The receiver in FIGS. 3 and 6 have two pair of locking-pin receiving holes 70 and 110, an outer pair of holes 110 and an inner pair of holes 70. The outer pair of holes 110 agree with the aforementioned SAE standard that was perhaps replaced or updated in 2000 by SAE J2513 JUN2000. Correspondingly, the outer pair 110 of holes agree with BOB-TACH® quick attach hookup design.

In contrast, the inner pair of holes 70 do not.

The inner pair of holes 70 correspond to hookup designs of older machines of other manufactures, including without limitation the Model No. 1845 skid steer loader of the CASE Construction Equipment company of Racine, Wisconsin.

FIGS. 4-5 and 7-8 (among other views) show the receiver 100 in accordance with the invention. It is an aspect of the invention that the receiver 100 in accordance with the invention also presents two pair of holes 110 and 120, but for distinctly different purposes of the FIG. 3 prior art disclosure.

Figure 7:
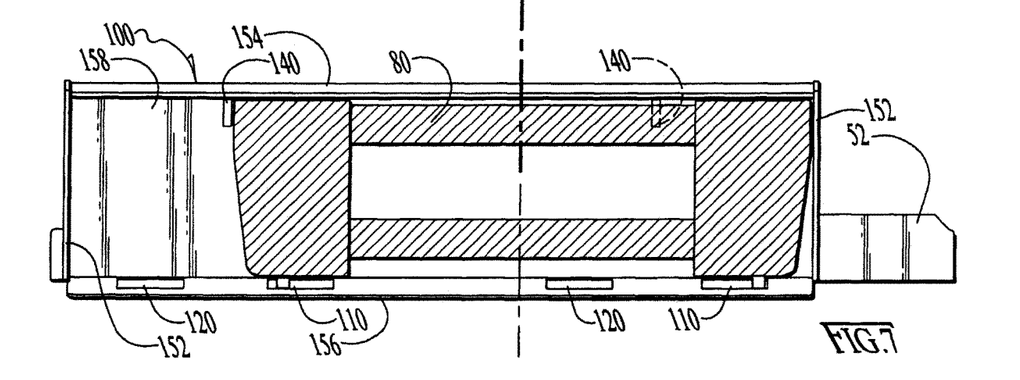
FIG. 7 is an elevational view taken in the direction of arrows VII-VII in FIG. 13, partly in section, and comparable to FIG. 4 in showing the attachment receiver in accordance with the invention hooked up with the vehicle jam structure in accordance with prior art in the first relative alignment therebetween.

Comparing the inventive receiver 100 as shown in FIG. 7 to the prior art receiver 60 in FIG. 6, one pair of holes 110 of inventive receiver 100 shown in FIG. 7 correspond to the outer two holes 110 in the prior art receiver 60 in FIG. 6.

Hence the first pair of holes 110 in FIG. 7 enables the attachment 52 to be hooked up to the vehicle 50 in a first alignment. Given the example of a mowing deck 52 and skid steer loader 50, the preferred first alignment is a centered alignment.

These two pair of holes might be more lengthily referred to as the pair of holes of the first alignment.

Figure 8:
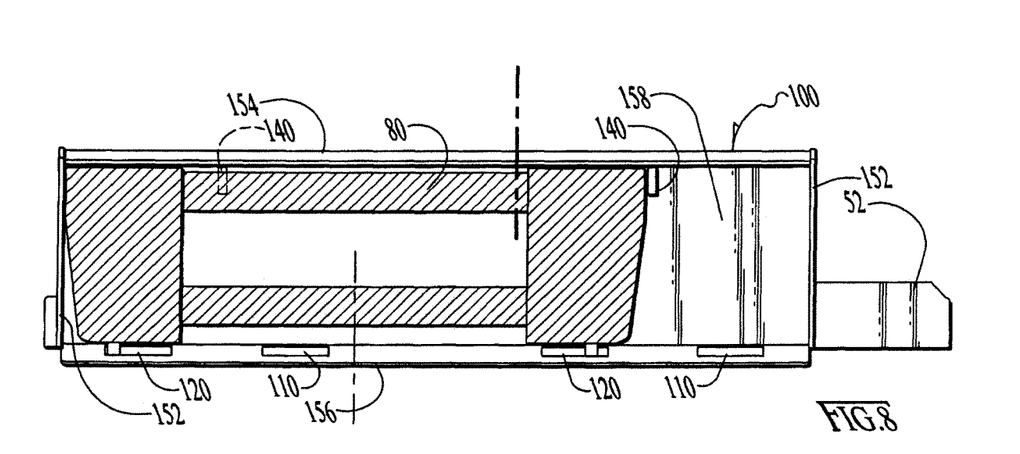
FIG. 8 is an elevational view taken in the direction of arrows VIII-VIII in FIG. 15, partly in section, and comparable to FIG. 5 in showing the attachment receiver in accordance with the invention hooked up with the vehicle jam structure in accordance with prior art in the second relative alignment therebetween.

Turning to FIG. 8, the other two pair of holes might be more lengthily referred to as the pair of holes of the second alignment. The second alignment has the attachment 52 offset one direction or another from the first alignment. Again, give the example of a mowing deck 52 or skid steer loader 50, the second alignment might have the mowing deck 52 shifted relatively port or starboard of the central plane of the skid steer loader 50 (the figures hereof show the offset to be starboard of the centered alignment) so that the mowing deck 52 can reach underneath (for example and without limitation) the lowest strand 72 of a barbed wire fence line 74.

By way of brief introduction, the receiver 100 in accordance with the invention is distinguished from the receiver 60 in accordance with the prior art in the following chief ways:

1—the inventive receiver 100 adds a second pair of holes 120 spaced in accordance with the aforementioned SAE standard SAE J2513 JUN2000;

2—the inventive receiver 100 is wider across the breadth thereof; and

3—the inventive receiver 100 adds a pair of side tabs 140.

These items will be returned to more particularly below after the detailed description which follows.

The receiver 100 comprises a rectangular frame of left and right spaced flanges 152 spacing a pair of spaced upper and lower flanges 154 and 156. The receiver 100 includes a front web 158 that is framed by the flanges 152 as well as 154 and 156. The left and right flanges 152 lie in vertical longitudinal planes (ie., when the attachment 52 is level). The upper and lower flanges 154 are inclined downward rearwardly at about 30° relative to the ground plane when the front web 158 is vertical. Hence the upper flange 154 forms an eave with respect to the front web 158 and where they intersect they form a 30° crease. The lower flange 156 forms a 30° slide relative to the front web 158. The upper and lower flanges 154 and 156 are more or less parallel.

As shown in the drawings, the front web 158 is a solid piece of plate steel, but this is optional and it need not be. It can be a grill work or cut away for most of its mid-span and so on.

Figure 12:
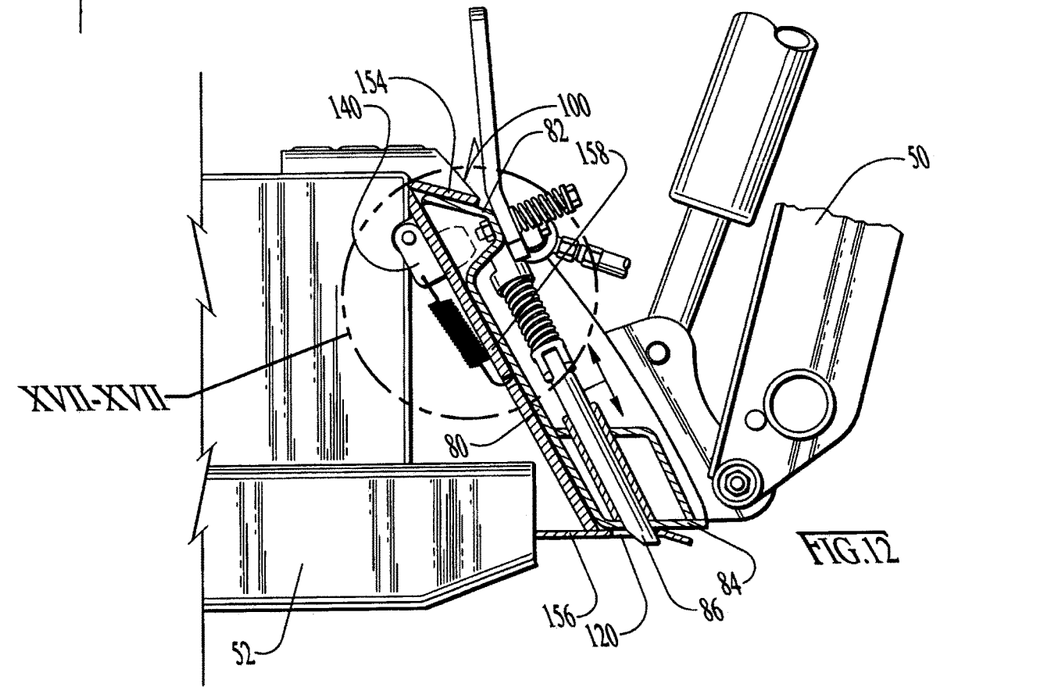
FIG. 12 is an enlarged-scale section view taken along the line XII-XII in FIG. 10.

FIG. 12 shows better one of the side tabs 140. By way of example and not limitation, the side tab 140 is produced from plate steel and has an ell-shape comprising a pivoted leg terminating in one end and a projecting leg terminating in another end, the two legs being joined together opposite each other's respective ends.

Figure 2:
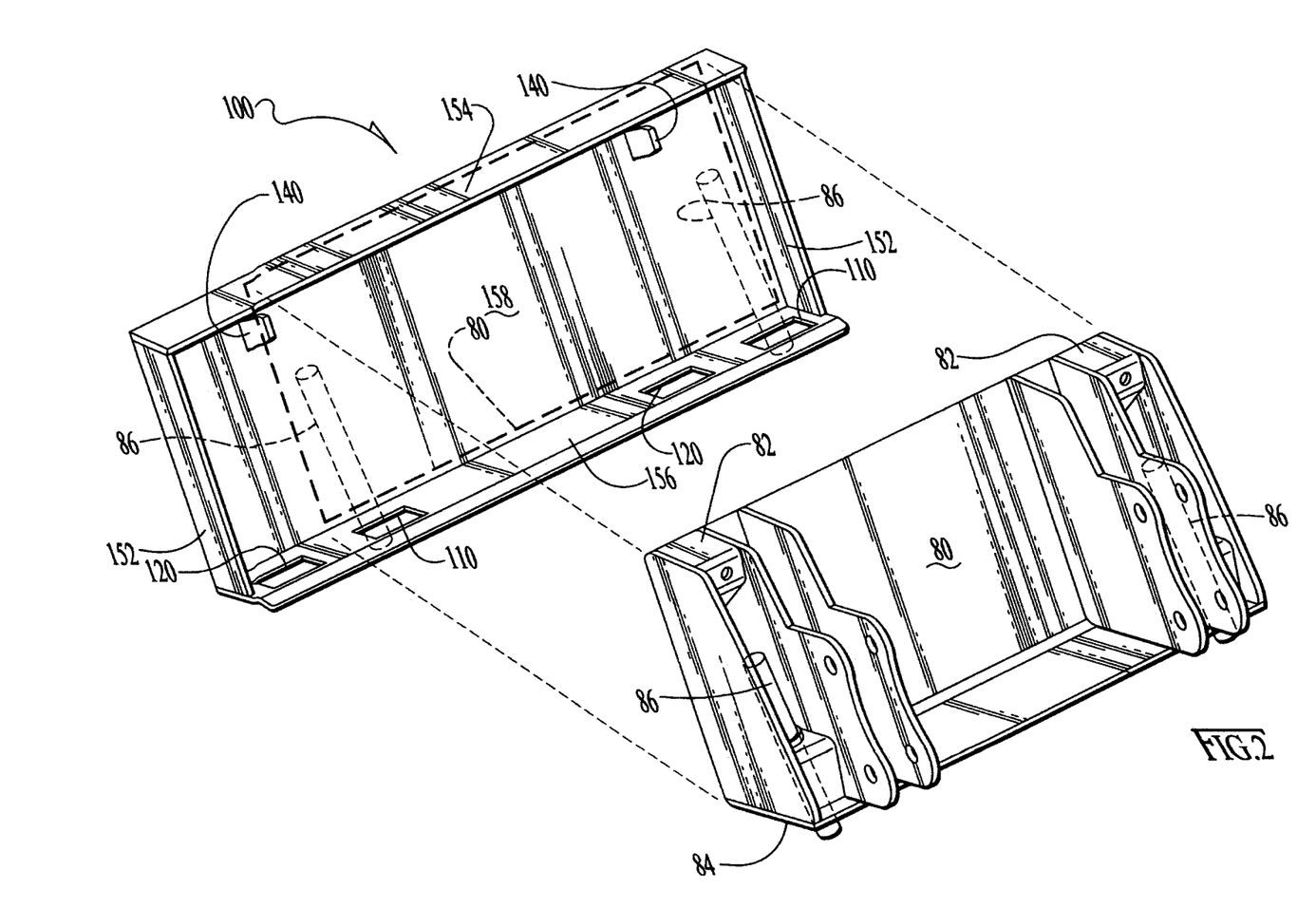
FIG. 2 is an exploded perspective view showing an attachment receiver in accordance with the invention and a vehicle jam structure in accordance with prior art for docking into and hooking up with the receiver.

FIG. 12 further shows that the vehicle 50 has a front-facing jam structure 80 in accordance with the prior art which jams into the receiver 100 and docks there. The jam structure 80 extends between spaced left and right sides and spaced upper and lower edges. The jam structure 80 might comprise a pair of forks as shown in FIGS. 6-8 or comprise a solid panel as shown in FIG. 2 and so on. The jam structure 80 has a pair of spaced wedge-forms 82 in its upper left and right corners along the upper edge and left and right sides respectively. These wedge-forms 82 hook into the eave-formed upper flange 154 of the receiver 100.

The jam structure 80 has a pair of spaced skid-forms 84 in its lower left and right corners along the lower edge and left and right sides respectively. These skid-forms 84 slide or scrape along the slide-formed lower flange 156 of the receiver 100. The jam structure 80 includes retractable locking pins 86 that engage either the first pair of holes 110 of the receiver 100 simultaneously, or the second pair of holes 120 of the receiver 100 simultaneously.

To review the figure views serially, FIG. 2 shows the receiver 100 in accordance with the invention and the vehicle jam structure 80 in accordance with prior art for docking into and hooking up with the receiver 100. The wedge-form 82 hooks up underneath the upper 154. The skid-form 84 slides or scrapes across the lower flange 156, ensuring the tight docking of the wedge-form 82 in the crease between the upper flange 154 and front web 158.

FIG. 3 is a block diagram showing the attachment receiver 60 in accordance with the prior art hooked up with the vehicle jam structure 80 in accordance with prior art.

The prior art receiver 60 is comparable to the inventive receiver 100 in having a front web flanked by side flanges that are contained in longitudinal vertical planes and then upper and lower flanges that are similarly inclined at 30° slopes relative the receiver 60's front web (none of this is shown). As far as the foregoing is concerned, the inventive receiver 100 is only distinctive in that there is greater distance between its left and right flanges 152. Simply put, the inventive receiver 100 is wider than but not taller than the prior art receiver 60.

Figure 4:
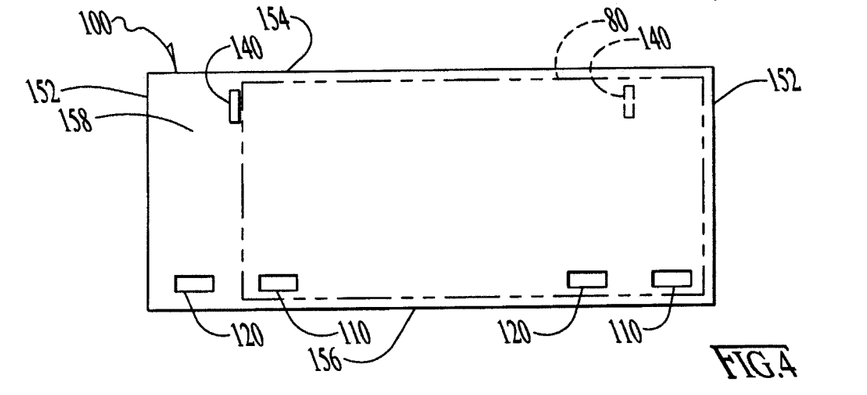
FIG. 4 is a block diagram showing the attachment receiver in accordance with the invention hooked up with the vehicle jam structure in accordance with prior art in a first relative alignment therebetween.

FIG. 4 is a block diagram showing the receiver 100 in accordance with the invention hooked up with the vehicle jam structure 80 in accordance with prior art in a first relative alignment therebetween.

Figure 5:
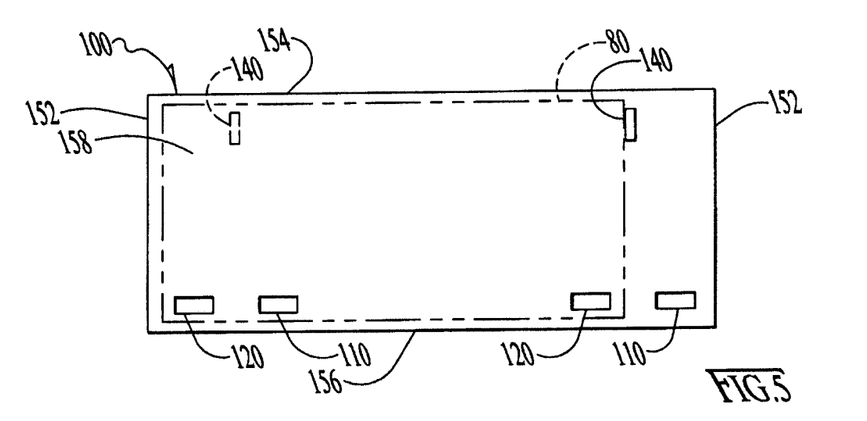
FIG. 5 is a block diagram showing the attachment receiver in accordance with the invention hooked up with the vehicle jam structure in accordance with prior art in a second relative alignment therebetween.

For comparison, FIG. 5 is a block diagram showing the receiver 100 in accordance with the invention hooked up with the vehicle jam structure 80 in accordance with prior art in a second relative alignment therebetween.

It is an aspect of the invention that the receiver 100 allows the jam structure 80 to couple in alternative alignments.

FIG. 6 is an elevational view, comparable to FIG. 3 and partly in section, showing the receiver 60 in accordance with the prior art hooked up with the vehicle jam structure 80 in accordance with prior art.

Figure 13:
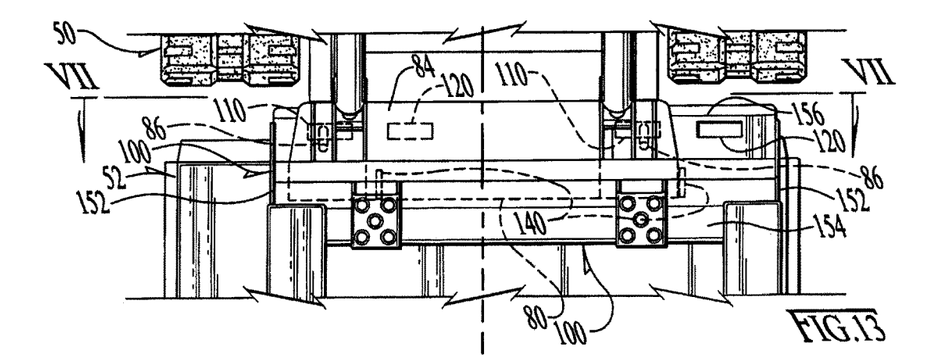
FIG. 13 is a top plan view showing the mowing deck (ie., the attachment) and the skid steer loader (ie., the vehicle) hooked up in the first relative alignment therebetween (eg., a centered alignment and as comparable to FIGS. 7 and 9)

FIG. 7 is an elevational view taken in the direction of arrows VII-VII in FIG. 13, partly in section, and comparable to FIG. 4 in showing the receiver 100 in accordance with the invention hooked up with the vehicle jam structure 80 in accordance with prior art in the first relative alignment therebetween.

Figure 15:
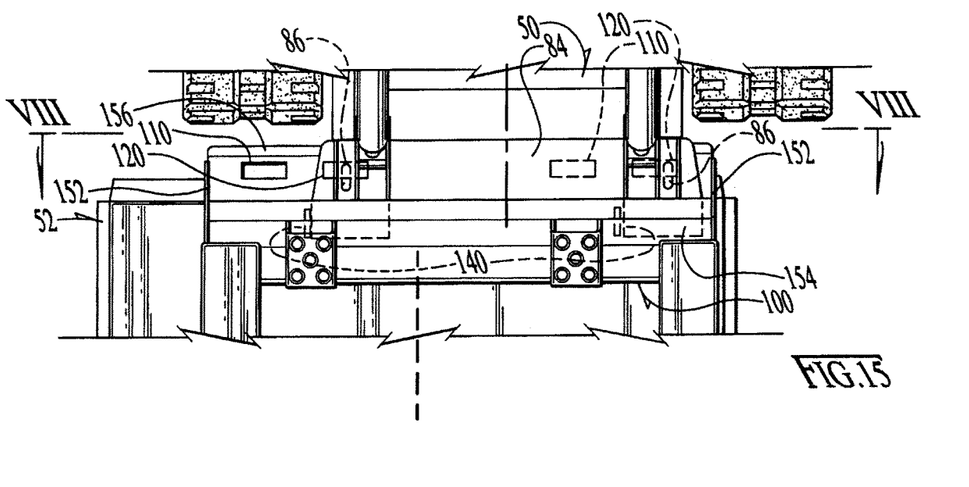
FIG. 15 is a top plan view showing the mowing deck (ie., the attachment) and the skid steer loader (ie., the vehicle) hooked up in the second relative alignment therebetween (eg., an offset alignment and as comparable to FIGS. 8 and 10)

FIG. 8 is an elevational view taken in the direction of arrows VIII-VIII in FIG. 15, partly in section, and comparable to FIG. 5 in showing the attachment receiver 100 in accordance with the invention hooked up with the vehicle jam structure 80 in accordance with prior art in the second relative alignment therebetween.

The series of the FIGS. 3-5 and then again FIGS. 6-8 show the purpose served by the side tabs 140. The prior art receiver 60 is sized so that its spaced left and right flanges closely embrace the left and right edges of the prior art jam structure 80.

The inventive receiver 100 is wider. In either of the alternative alignments, one side flange 152 of the receiver 100 or the other side flange 152 is going to be out of contact with one of the side edges of the jam structure 80. These side tabs 140 step in and supply the missing contact of the side flanges 152.

To return to FIG. 12, the side tabs 140 are spring loaded such that the side tab 140 which is not needed in any instance can yield to the jam structure 80 behind the plane of the front web 158.

Figure 9:
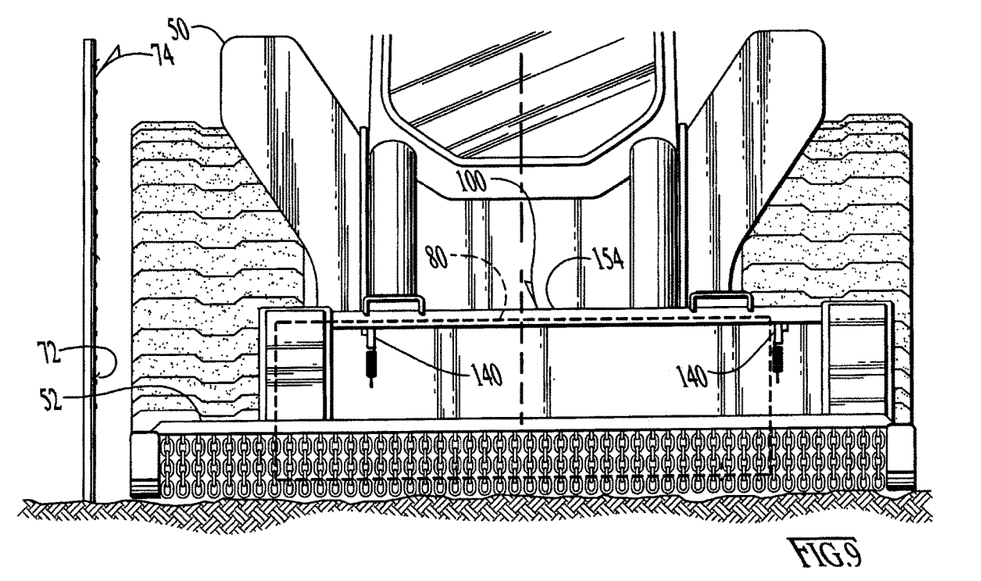
FIG. 9 is a front elevational view showing the mowing deck (ie., the attachment) and the skid steer loader (ie., the vehicle) hooked up in the first relative alignment therebetween (eg., a centered alignment as comparable to FIG. 7)

FIG. 9 is a front elevational view showing the mowing deck 52 (ie., the attachment 52) and the skid steer loader 50 (ie., the vehicle 50) hooked up in the first relative alignment therebetween (eg., a centered alignment as comparable to FIG. 7).

Note that the fence post 74 is spaced clear of the mowing deck 52.

Figure 10:
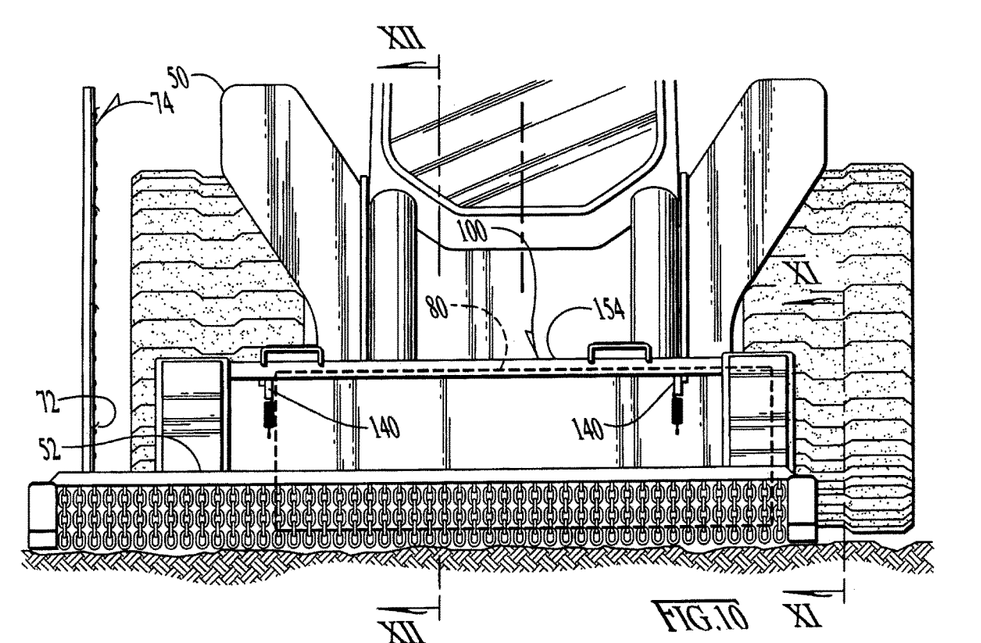
FIG. 10 is a front elevational view showing the mowing deck (ie., the attachment) and the skid steer loader (ie., the vehicle) hooked up in the second relative alignment therebetween (eg., an offset alignment as comparable to FIG. 8)

FIG. 10 is a front elevational view showing the mowing deck 52 (ie., the attachment 52) and the skid steer loader 50 (ie., the vehicle 50) hooked up in the second relative alignment therebetween (eg., an offset alignment as comparable to FIG. 8). Here, the mowing deck 52 is headed straight for a collision with post 74, but as shown in FIG. 1 the mowing deck 52 is really just extended underneath the lowest strand 72 of barb wire.

Figure 11:
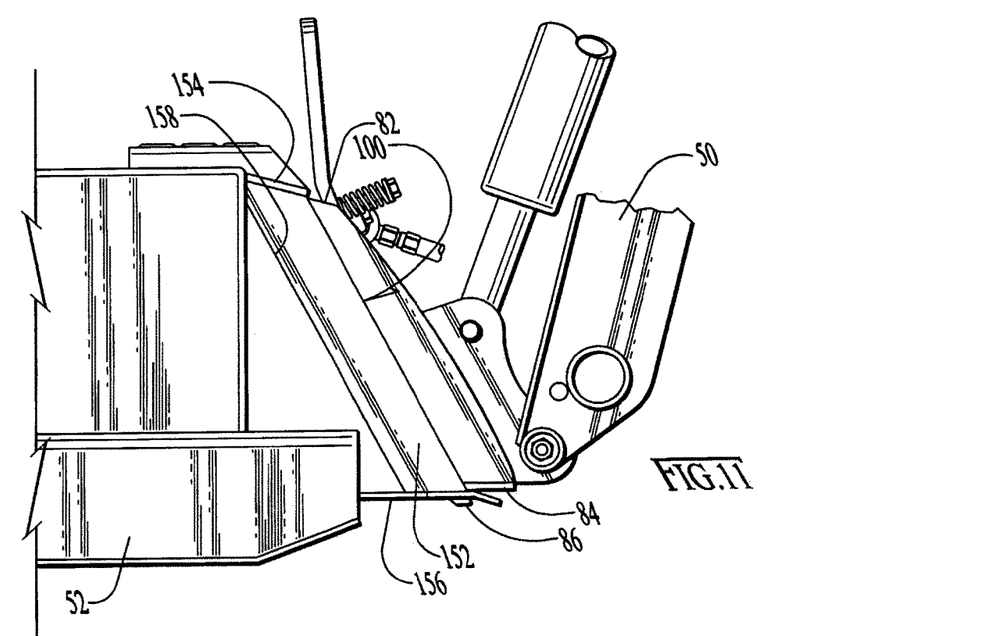
FIG. 11 is an enlarged-scale side elevation view taken in the direction of arrows XI-XI in FIG. 10.

FIGS. 11 and 12 show, among other things how the locking pins 86 of the jam structure 80 releasably engage with either the first pair of holes 110 or the second pair of holes 120.

FIGS. 4-5 and/or 7-8 show that the locking pins 86 of the jam structure 80 cannot engage one hole of the first pair of holes 110 and one hole of the second pair of holes 120 simultaneously. The locking pins 86 have to enter either both holes 110 or else both holes 120 exclusively, but not one of each simultaneously.

FIG. 13 is a top plan view showing the mowing deck 52 (ie., the attachment 52) and the skid steer loader 50 (ie., the vehicle 50) hooked up in the first relative alignment therebetween (eg., a centered alignment and as comparable to FIGS. 7 and 9).

Figure 14:
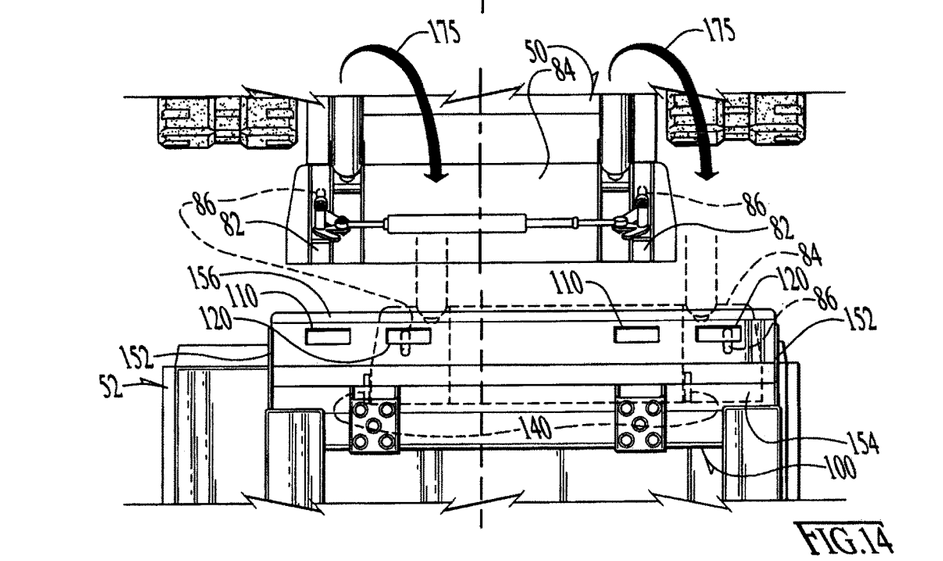
FIG. 14 is a top plan view (comparable to either FIG. 13 or 15) showing the skid steer loader (ie., the vehicle) detached and backed away from the mowing deck (ie., the attachment) so that the skid steer loader (ie., the vehicle) shifts in the direction of the arrows to switch between the hookup in the first relative alignment (eg., as shown in FIG. 13) to a hookup in the second relative alignment (eg., as shown in FIG. 15)

FIG. 14 is a top plan view (comparable to either FIG. 13 or 15) showing the skid steer loader 50 (ie., the vehicle 50) detached and backed away from the mowing deck 52 (ie., the attachment 52) so that the skid steer loader 50 (ie., the vehicle 50) shifts in the direction of the arrows 175 to switch between the hookup in the first relative alignment (eg., as shown in FIG. 13) to a hookup in the second relative alignment (eg., as shown in FIG. 15).

FIG. 15 is a top plan view showing the mowing deck 52 (ie., the attachment 52) and the skid steer loader 50 (ie., the vehicle 50) hooked up in the second relative alignment therebetween (eg., an offset alignment and as comparable to FIGS. 8 and 10).

Figure 16:
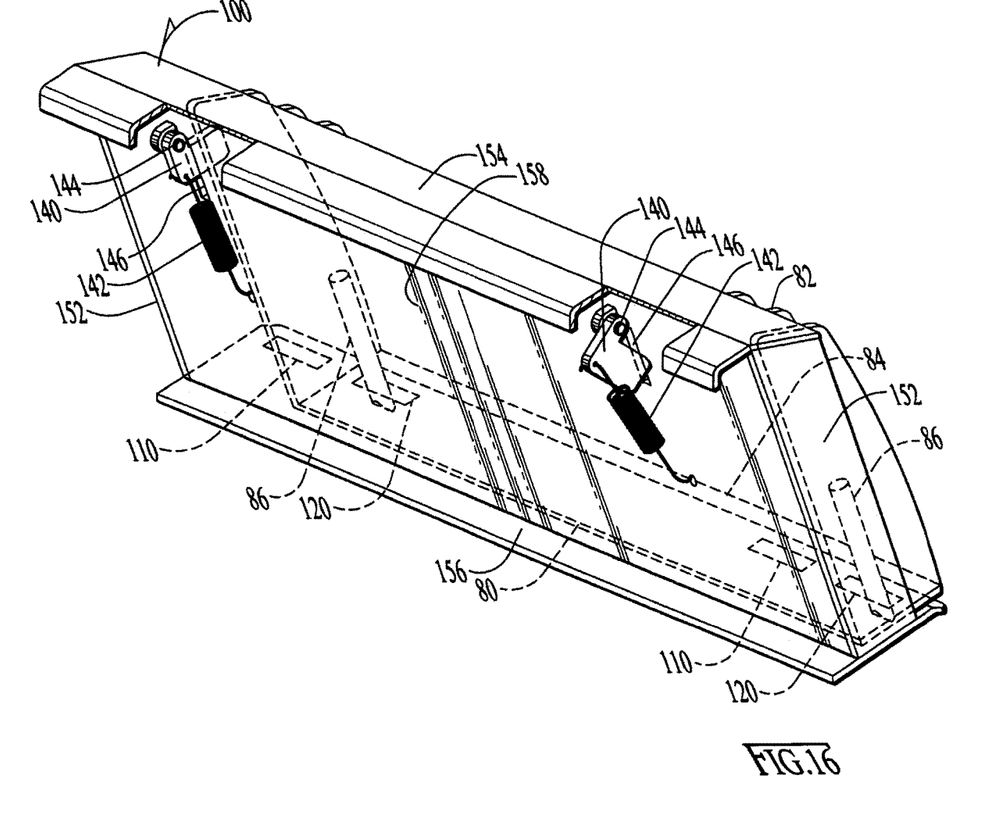
FIG. 16 is a perspective view comparable to FIG. 2 except showing the attachment receiver in accordance with the invention almost in isolation and from a front left perspective (ie., driver's left or port side), and with much of vehicle jam structure in accordance with prior art removed from view except for outline portions shown in dashed line and shown docked (or coupled or hooked-up) with the attachment receiver in accordance with the invention.
Figure 17:
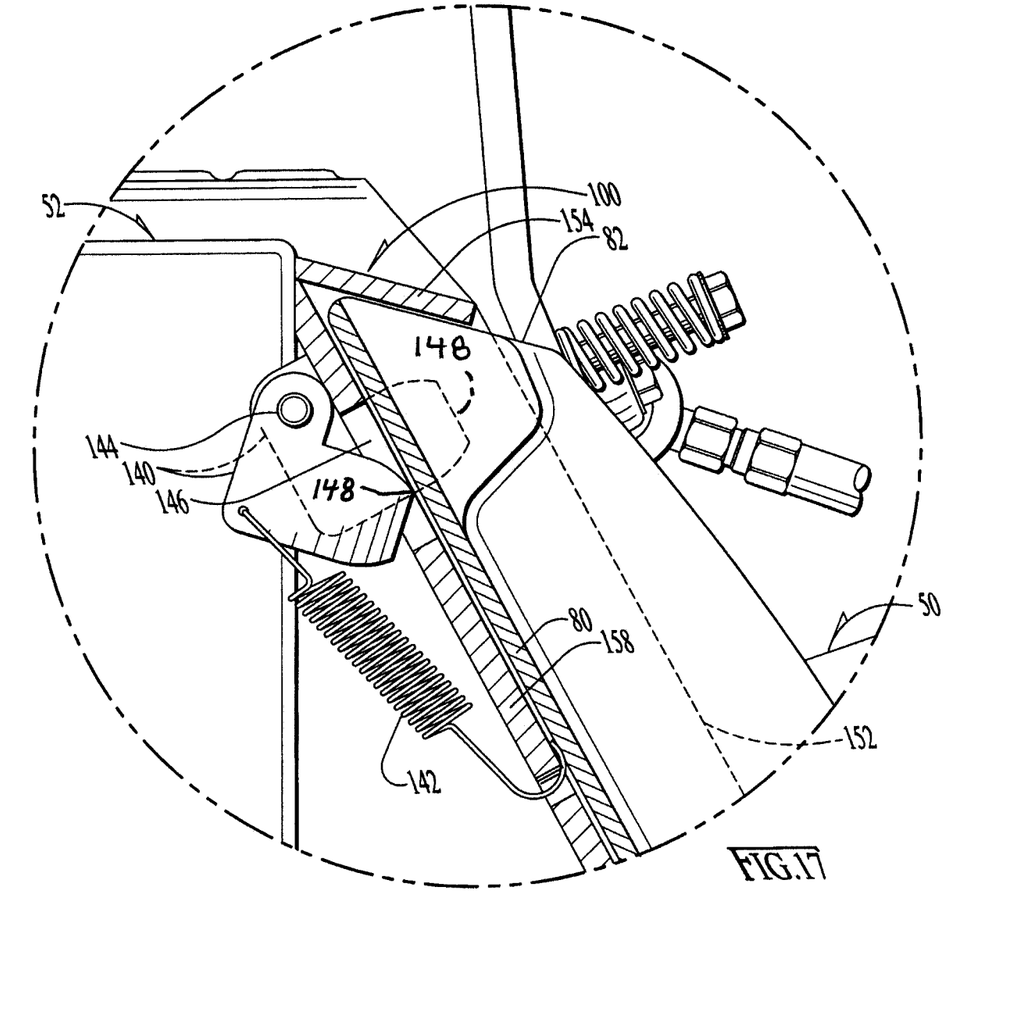
FIG. 17 is an enlarged-scale section view of detail XVII-XVII in FIG. 12.

FIG. 16 is a perspective view comparable to FIG. 2 except showing the attachment receiver 100 in accordance with the invention almost in isolation and from a front left perspective (ie., driver's left or port side), and with much of vehicle jam structure 80 in accordance with prior art removed from view except for outline portions shown in dashed line and shown docked (or coupled or hooked-up) with the attachment receiver 100 in accordance with the invention. FIG. 17 is an enlarged-scale section view of detail XVII-XVII in FIG. 12.

As mentioned in connection with to FIG. 12, the side tabs 140 are spring loaded such that the side tab 140 which is not needed in any instance can yield to the jam structure 80 behind the plane of the front web 158. FIGS. 16 and 17 show this better. The spring loaded side tabs 140 are L-shaped (foot shaped) and are biased by a tab spring 142 to normally pivot about pivot pin (pivot axis) 144 so that a toe-portion of the spring-loaded side tabs 140 pivot about the pivot axis 144 and thus so that an upper-ankle portions extends out through tab aperture 146 in front web 158 (as shown in dashed lines in FIG. 17).

Hence the side tabs 140 are pivotal between extremes. One extreme is the extended extreme (or disposition) and has the side tab 140 extended rearward of the plane of the web 158 (as shown in dashed lines in FIG. 17):—especially the upper-ankle (or shank) portion of the L-shaped (foot-shaped) side tab 140.

The other extreme is the retracted (or yielding) extreme (or disposition) and has all of the side tab 140 in a retracted or yielding disposition such that, at most, some portions of the side tab 140 is flush with or forward of the plane of the front web 158. This is shown in solid lines in FIG. 17.

As best shown in solid lines in FIG. 17, the upper-ankle portion of the side tab 140 defines a form of a cam surface 148 which is driven by the jam structure 80 to drive the side tab 140 into the yielding disposition. As shown in dashed lines in FIG. 17, in the absence of jam structure driving against the cam surface 148, the side tab is free to take the extended disposition.

Pause can be taken to summarize aspects of the invention. To begin with, it is an aspect of the invention that there are two pair of holes. Each pair is sized and laterally spaced to meet the dimensional requirements of one industry standard, not two different industry standards. The industry standard preferred here is SAE J2513 and its ISO counterpart (ISO equivalent), namely ISO 24410. The last version of the SAE standard is believed to be formally titled SAE J2513 JUN2006—"Earthmoving Machinery-Coupling of Attachments to Skid Steer Loaders J2513_200006." see https://www.sac.org/standards/content/j2513_200006/, accessed online Feb. 27, 2020.

This was superseded by an SAE standard of the same number (J2513), but just a later date, entitled "Earthmoving Machinery-Coupling of Attachments to Skid Steer Loaders (Cancelled May 2008, Superseded by ISO 24410) J2513_200805," see https://www.sae.org/standards/content/j2513_200805/, accessed online Feb. 27, 2020.

As the title states, that 2008 SAE standard has in turn been superseded by an ISO standard (24410). The abstract of the ISO standard accessed on the same date is "ISO 24410:2005 Earth-moving machinery—Coupling of attachments to skid steer loaders,"

https://www.iso.org/standard/37202.html, accessed online Feb. 27, 2020.

The SAE standard and ISO standard have no noticeable difference to the inventor hereof, as he manufactures according to the SAE dimensional requirements and his equipment works fine across a broad spectrum of manufacturers of skid steer loaders.

Other skid-steer attachment manufacturers state the same equivalency. For example, one manufacturer's website accessed online on Feb. 27, 2020, in the "Frequently Asked Questions" section thereof, reported as follows: "*All [our] skid steer attachments are manufactured with a universal mount to fit most skid steer loaders. The mounting frame is built to ISO* 24410 *and SAE J2513 standards.*"

Again, evidently the ISO 24410 standard and the SAE J2513 standard are not too different if they are different at all. However, there was an earlier standard that comprised a narrower design. The SAE J2513 standard even expressed as much as follows, to quote: "This SAE Standard sets forth standard dimension requirements for the loader attachment bracket and attachment interface to allow interchangeability of attachments on skid steer loaders whose operating mass . . . is 4,500 kg or less. Narrow skid steer loaders may have a width that does not allow compliance with this standard". (Underlining supplied.)

Attachment hookup or coupling designs exhibiting a wide pair of holes and a narrow pair of holes do so to accommodate—not the same skid steer loader, but—different skid steer loaders of two different designs. And both hookups will be on centered alignments for both designs. A first alignment and an offset second alignment is never achieved in any event is not known in any of the prior art attachments.

In view of the foregoing, various aspects and objects of the invention are provided according to the following brief summary.

It is an object to provide a mower-to-skid steer loader mounting structure affixed to a heavy-duty mowing deck and adapted for coupling with a front-facing jam structure (80) of a skid steer loader, wherein in which said front-facing jam structure (80) includes a laterally-spaced pair of retractable locking pins (86), wherein standard dimensional requirements for the front-facing jam structure (80) and including for the laterally-spaced pair of retractable locking pins (86) are stated in a uniform industry standard which allows for self coupling and self decoupling between the front-facing jam structure (80) and the mounting structure. The; mounting structure might be characterized by:

a top flange and a bottom flange;

wherein the bottom flange extends between a laterally-spaced left and right edge;

wherein the bottom flange is formed with a first pair of laterally-spaced left and right holes (110) which are sized and laterally-spaced apart in accordance with the uniform industry standard and thereby are able to receive the laterally-spaced pair of retractable locking pins (86) of the front-facing jam structure (80) of a skid steer loader;

wherein the bottom flange is further formed with a second pair of laterally-spaced left and right holes (120) offset from the first pair of laterally-spaced left and right holes (110) and which said second pair of laterally-spaced left and right holes (120) are sized and laterally-spaced apart in accordance with the uniform industry standard and thereby are also able to receive the laterally-spaced pair of retractable locking pins (86) of the front-facing jam structure (80) of a skid steer loader independently of the first pair of laterally-spaced left and right holes (110);

whereby the mounting structure not only allows self coupling and self decoupling between the front-facing jam structure (80) and the mounting structure but also allows the self decoupling from a first alignment (~110) between the skid steer loader and the heavy-duty mowing deck to be followed by a subsequent self coupling into an offset second alignment (~120) between the skid steer loader and the heavy-duty mowing deck.

The mower-to-skid steer loader mounting structure as described immediately above might be further characterized by:

the left hole of the first pair of laterally-spaced holes (110) lies between the left and right hole of the second pair of laterally-spaced holes (120); and the right hole of the second pair of laterally-spaced holes (120) lies between the left and right hole of the first pair of laterally-spaced holes (110).

The mower-to-skid steer loader mounting structure as described immediately above might be even furthermore characterized by:

the mounting structure is affixed to the heavy-duty mowing deck such that the first alignment (~110) corresponds to a centered alignment between the skid steer loader and the heavy-duty mowing deck;

whereby the offset second alignment (~120) has the heavy-duty the mowing deck offset in one direction shifted to the left or right or the opposite direction shifted to the right or left so that the mowing deck may reach underneath the lowest strand of a barbed wire fence line.

The mower-to-skid steer loader mounting structure as described immediately above might be moreover characterized by:

the uniform industry standard consists of an SAE or ISO industry standard and/or, more particularly, the SAE industry standard would preferably consist of SAE J2513 while the ISO industry standard would preferably consist of ISO 2441. In both instances, the mounting structure is sized and proportioned to be wider in breadth than the SAE or ISO industry standard.

The mower-to-skid steer loader mounting structure as described immediately above might further comprise:

a left flange and a right flange that are laterally-spaced apart from one another; and a left side tab and a right side tab that are laterally-spaced apart from one another;

wherein the mounting structure comprises a rectangular frame comprising the left flange and the right flange as well as the top flange and the bottom flange, and wherein the left flange and right flange are elongated and space apart the top flange and the bottom flange; and the left side tab and the right side tab are disposed not only intermediate the left flange and the right flange but also intermediate the top flange and the bottom flange;

whereby the front-facing jam structure (80) has a left side edge and a right side edge that are laterally-spaced apart from one another and which are closely embraced between the left flange and the right side tab when the front-facing jam structure (80) is coupled into either the first alignment or the offset second alignment, and which said left side edge and said right side edge of the front-facing jam structure (80) are closely embraced between the left side tab and the right flange when the front-facing jam structure (80) is coupled into the other of the first alignment or the offset second alignment.

The mower-to-skid steer loader mounting structure as described immediately above might even further still comprise:

springs for the side tabs;

wherein the side tabs are mounted relative to the mounting structure so that each side tab is pivotable between an extended disposition and a yielding disposition; and wherein the springs are disposed between the side tabs and mounting structure to bias the side tabs into extended dispositions therefor while allowing independent yielding to yielding dispositions.

The mower-to-skid steer loader mounting structure as described immediately above might be additionally characterized by:

the right side tab is in an extended disposition while the left tab is in a yielding disposition when the laterally-spaced left and right side edges of the front-facing jam structure (80) are closely embraced between the left flange and right side tab; and the left side tab is in an extended disposition while the right side tab is in a yielding disposition when the laterally-spaced left and right side edges of the front-facing jam structure (80) are closely embraced between the left side tab and right flange.

The mower-to-skid steer loader mounting structure as described immediately above might also be further characterized by:

the rectangular frame of the mounting structure further comprises a web that is framed by the left and right spaced flanges and the top and bottom spaced flanges;

the web defines a plane; and the side tabs' extended dispositions have the side tabs extending rearward of the plane of the web while the side tabs' yielding dispositions have the side tabs flush with or forward of the plane of the web.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A mower-to-skid steer loader mounting structure affixed to a heavy-duty mowing deck and configured to couple with a front-facing jam structure (80) of a skid steer loader, where the front-facing jam structure (80) includes a laterally-spaced pair of retractable locking pins (86), wherein standard dimensional requirements for the front-facing jam structure (80) and including for the laterally-spaced pair of retractable locking pins (86) are stated in a uniform industry standard which allows for self coupling and self decoupling between the front-facing jam structure (80) and the mounting structure: the mounting structure comprising:

a top flange and a bottom flange;
wherein the bottom flange extends between a laterally-spaced left and right edge;
wherein the bottom flange is formed with a first pair of laterally-spaced left and right holes (110) which are sized and laterally-spaced apart in accordance with the uniform industry standard and thereby are configured to receive the laterally-spaced pair of retractable locking pins (86) of the front-facing jam structure (80) of a skid steer loader;
wherein the bottom flange is further formed with a second pair of laterally-spaced left and right holes (120) offset from the first pair of laterally-spaced left and right holes (110) and where the second pair of laterally-spaced left and right holes (120) are sized and laterally-spaced apart in accordance with the uniform industry standard and thereby are also configured to receive the laterally-spaced pair of retractable locking pins (86) of the front-facing jam structure (80) of a skid steer loader independently of the first pair of laterally-spaced left and right holes (110);
whereby the mounting structure not only allows self coupling and self decoupling between the front-facing jam structure (80) and the mounting structure but also allows the self decoupling from a first alignment (~110) between the skid steer loader and the heavy-duty mowing deck to be followed by a subsequent self coupling into an offset second alignment (~120) between the skid steer loader and the heavy-duty mowing deck;
wherein the left hole of the first pair of laterally-spaced holes (110) lies between the left and right hole of the second pair of laterally-spaced holes (120); and
the right hole of the second pair of laterally-spaced holes (120) lies between the left and right hole of the first pair of laterally-spaced holes (110).

2. A mower-to-skid steer loader mounting structure affixed to a heavy-duty mowing deck and configured to couple with a front-facing jam structure (80) of a skid steer loader, where the front-facing jam structure (80) includes a laterally-spaced pair of retractable locking pins (86), wherein standard dimensional requirements for the front-facing jam structure (80) and including for the laterally-spaced pair of retractable locking pins (86) are stated in a uniform industry standard which allows for self coupling and self decoupling between the front-facing jam structure (80) and the mounting structure: the mounting structure comprising:

a top flange and a bottom flange;
wherein the bottom flange extends between a laterally-spaced left and right edge;
wherein the bottom flange is formed with a first pair of laterally-spaced left and right holes (110) which are sized and laterally-spaced apart in accordance with the uniform industry standard and thereby are configured to receive the laterally-spaced pair of retractable locking pins (86) of the front-facing jam structure (80) of a skid steer loader;
wherein the bottom flange is further formed with a second pair of laterally-spaced left and right holes (120) offset from the first pair of laterally-spaced left and right holes (110) and where the second pair of laterally-spaced left and right holes (120) are sized and laterally-spaced apart in accordance with the uniform industry standard and thereby are also configured to receive the laterally-spaced pair of retractable locking pins (86) of the front-facing jam structure (80) of a skid steer loader independently of the first pair of laterally-spaced left and right holes (110);
whereby the mounting structure not only allows self coupling and self decoupling between the front-facing jam structure (80) and the mounting structure but also allows the self decoupling from a first alignment (~110) between the skid steer loader and the heavy-duty mowing deck to be followed by a subsequent self coupling into an offset second alignment (~120) between the skid steer loader and the heavy-duty mowing deck;
wherein the mounting structure is affixed to the heavy-duty mowing deck such that the first alignment (~110) corresponds to a centered alignment between the skid steer loader and the heavy-duty mowing deck;
whereby the offset second alignment (~120) has the heavy-duty the mowing deck offset in one direction shifted to the left or right or the opposite direction shifted to the right or left so that the mowing deck may reach underneath the lowest strand of a barbed wire fence line.

3. The mower-to-skid steer loader mounting structure of claim 1, wherein:
the uniform industry standard consists of an SAE or ISO industry standard.

4. The mower-to-skid steer loader mounting structure of claim 3, wherein:
the SAE industry standard consists of SAE J2513 while the ISO industry standard consists of ISO 2441.

5. The mower-to-skid steer loader mounting structure of claim 3, wherein:
the mounting structure is sized and proportioned to be wider in breadth than the SAE or ISO industry standard.

6. The mower-to-skid steer loader mounting structure of claim 1, further comprising:
a left flange and a right flange that are laterally-spaced apart from one another; and
a left side tab and a right side tab that are laterally-spaced apart from one another;
wherein the mounting structure comprises a rectangular frame comprising the left flange and the right flange as well as the top flange and the bottom flange, and wherein the left flange and right flange are elongated and space apart the top flange and the bottom flange; and
the left side tab and the right side tab are disposed not only intermediate the left flange and the right flange but also intermediate the top flange and the bottom flange;
whereby the front-facing jam structure (80) has a left side edge and a right side edge that are laterally-spaced apart from one another and which are closely embraced between the left flange and the right side tab when the front-facing jam structure (80) is coupled into either the first alignment or the offset second alignment, and where the left side edge and the right side edge of the front-facing jam structure (80) are closely embraced between the left side tab and the right flange when the front-facing jam structure (80) is coupled into the other of the first alignment or the offset second alignment.

7. A mower-to-skid steer loader mounting structure affixed to a heavy-duty mowing deck and configured to couple with a front-facing jam structure (80) of a skid steer loader, where the front-facing jam structure (80) includes a laterally-spaced pair of retractable locking pins (86), wherein standard dimensional requirements for the front-facing jam structure (80) and including for the laterally-spaced pair of retractable locking pins (86) are stated in a uniform industry standard which allows for self coupling and self decoupling between the front-facing jam structure (80) and the mounting structure: the mounting structure comprising:

a top flange and a bottom flange;

wherein the bottom flange extends between a laterally-spaced left and right edge;

wherein the bottom flange is formed with a first pair of laterally-spaced left and right holes (110) which are sized and laterally-spaced apart in accordance with the uniform industry standard and thereby are configured to receive the laterally-spaced pair of retractable locking pins (86) of the front-facing jam structure (80) of a skid steer loader;

wherein the bottom flange is further formed with a second pair of laterally-spaced left and right holes (120) offset from the first pair of laterally-spaced left and right holes (110) and where the second pair of laterally-spaced left and right holes (120) are sized and laterally-spaced apart in accordance with the uniform industry standard and thereby are also configured to receive the laterally-spaced pair of retractable locking pins (86) of the front-facing jam structure (80) of a skid steer loader independently of the first pair of laterally-spaced left and right holes (110);

whereby the mounting structure not only allows self coupling and self decoupling between the front-facing jam structure (80) and the mounting structure but also allows the self decoupling from a first alignment (~110) between the skid steer loader and the heavy-duty mowing deck to be followed by a subsequent self coupling into an offset second alignment (~120) between the skid steer loader and the heavy-duty mowing deck;

the mower-to-skid steer loader mounting structure of further comprising:

springs for the side tabs;

wherein the side tabs are mounted relative to the mounting structure so that each side tab is pivotable between an extended disposition and a yielding disposition; and     wherein the springs are disposed between the side tabs and mounting structure to bias the side tabs into extended dispositions therefor while allowing independent yielding to yielding dispositions.

8. The mower-to-skid steer loader mounting structure of claim 7, wherein:

the right side tab is in an extended disposition while the left tab is in a yielding disposition when the laterally-spaced left and right side edges of the front-facing jam structure (80) are closely embraced between the left flange and right side tab; and     the left side tab is in an extended disposition while the right side tab is in a yielding disposition when the laterally-spaced left and right side edges of the front-facing jam structure (80) are closely embraced between the left side tab and right flange.

9. The mower-to-skid steer loader mounting structure of claim 8, wherein:

the rectangular frame of the mounting structure further comprises a web that is framed by the left and right spaced flanges and the top and bottom spaced flanges; the web defines a plane; and     the side tabs' extended dispositions have the side tabs extending rearward of the plane of the web while the side tabs' yielding dispositions have the side tabs flush with or forward of the plane of the web.

10. A mounting structure affixed to a heavy-duty skid-steer-loader attachment and adapted for coupling configured to couple with a front-facing jam structure (80) of a skid steer loader, which-said where the front-facing jam structure (80) includes a laterally-spaced pair of retractable locking pins (86), wherein standard dimensional requirements for the front-facing jam structure (80) and including for the laterally-spaced pair of retractable locking pins (86) are stated in a uniform industry standard which allows for self coupling and self decoupling between the front-facing jam structure (80) and the mounting structure; the mounting structure comprising:

a top flange and a bottom flange;

wherein the bottom flange extends between a laterally-spaced left and right edge;

wherein the bottom flange is formed with a first pair of laterally-spaced left and right holes (110) which are sized and laterally-spaced apart in accordance with the uniform industry standard and thereby are configured to receive the laterally-spaced pair of retractable locking pins (86) of the front-facing jam structure (80) of a skid steer loader;

wherein the bottom flange is further formed with a second pair of laterally-spaced left and right holes (120) laterally offset either to the left or right relative the first pair of laterally-spaced left and right holes (110) and where the second pair of laterally-spaced left and right holes (120) are sized and laterally-spaced apart in accordance with the uniform industry standard and thereby are also configured to receive the laterally-spaced pair of retractable locking pins (86) of the front-facing jam structure (80) of a skid steer loader independently of the first pair of laterally-spaced left and right holes (110);

wherein the second pair of laterally-spaced left and right holes (120) laterally offset either to the left or right relative the first pair of laterally-spaced left and right holes (110) such that one of the second pair of laterally-spaced left and right holes (120) lies in between first pair of laterally-spaced left and right holes (110) and that the other of the second pair of laterally-spaced left and right holes (120) lies outside of both of the pair of laterally-spaced left and right holes (110);

whereby the mounting structure not only allows self coupling and self decoupling between the front-facing jam structure (80) and the mounting structure but also allows the self decoupling from a first alignment (~110) between the skid steer loader and the heavy-duty attachment to be followed by a subsequent self coupling into an offset second alignment (~120) between the skid steer loader and the heavy-duty attachment.

11. The mounting structure of claim 10, wherein:

the left hole of the first pair of laterally-spaced holes (110) lies between the left and right hole of the second pair of laterally-spaced holes (120); and the right hole of the second pair of laterally-spaced holes (120) lies between the left and right hole of the first pair of laterally-spaced holes (110).

12. The mounting structure of claim 10, wherein:

the mounting structure is affixed to the heavy-duty attachment such that the first alignment (~110) corresponds to a centered alignment between the skid steer loader and the heavy-duty attachment;

whereby the offset second alignment (~120) has the heavy-duty the mowing deck offset in one direction shifted to the left or right or the opposite direction shifted to the right or left so that the mowing deck may reach underneath the lowest strand of a barbed wire fence line.

13. The mounting structure of claim 10, wherein:
the uniform industry standard consists of an SAE or ISO industry standard.

14. The mounting structure of claim 13, wherein:
the SAE industry standard consists of SAE J2513 while the ISO industry standard consists of ISO 2441.

15. The mounting structure of claim 13, wherein:
the mounting structure is sized and proportioned to be wider in breadth than the SAE or ISO industry standard.

16. The mounting structure of claim 10, further comprising:
a left flange and a right flange that are laterally-spaced apart from one another; and
a left side tab and a right side tab that are laterally-spaced apart from one another;
wherein the mounting structure comprises a rectangular frame comprising the left flange and the right flange as well as the top flange and the bottom flange, and wherein the left flange and right flange are elongated and space apart the top flange and the bottom flange; and
the left side tab and the right side tab are disposed not only intermediate the left flange and the right flange but also intermediate the top flange and the bottom flange;
whereby the front-facing jam structure (80) has a left side edge and a right side edge that are laterally-spaced apart from one another and which are closely embraced between the left flange and the right side tab when the front-facing jam structure (80) is coupled into either the first alignment or the offset second alignment, and where the left side edge and the right side edge of the front-facing jam structure (80) are closely embraced between the left side tab and the right flange when the front-facing jam structure (80) is coupled into the other of the first alignment or the offset second alignment.

17. The mounting structure of claim 16, further comprising:
springs for the side tabs;
wherein the side tabs are mounted relative to the mounting structure so that each side tab is pivotable between an extended disposition and a yielding disposition; and
wherein the springs are disposed between the side tabs and mounting structure to bias the side tabs into extended dispositions therefor while allowing independent yielding to yielding dispositions.

18. The mounting structure of claim 17, wherein:
the right side tab is in an extended disposition while the left tab is in a yielding disposition when the laterally-spaced left and right side edges of the front-facing jam structure (80) are closely embraced between the left flange and right side tab; and
the left side tab is in an extended disposition while the right side tab is in a yielding disposition when the laterally-spaced left and right side edges of the front-facing jam structure (80) are closely embraced between the left side tab and right flange.

19. The mounting structure of claim 18, wherein:
the rectangular frame of the mounting structure further comprises a web that is framed by the left and right spaced flanges and the top and bottom spaced flanges;
the web defines a plane; and
the side tabs' extended dispositions have the side tabs extending rearward of the plane of the web while the side tabs' yielding dispositions have the side tabs flush with or forward of the plane of the web.

\* \* \* \* \*